United States Patent [19]

Franer

[11] 3,772,081

[45] Nov. 13, 1973

[54] EMBOSSABLE MAGNETIC COMPOSITE FILM

[75] Inventor: Victor R. Franer, Roseville Village, Minn.

[73] Assignee: Minnesota Mining and Manufacturing Company, Saint Paul, Minn.

[22] Filed: July 19, 1971

[21] Appl. No.: 163,915

[52] U.S. Cl. .......... 117/239, 117/237, 179/100.2 A, 274/41.4, 340/174.1 R

[51] Int. Cl. .......... H01f 10/00

[58] Field of Search .......... 117/239, 237; 274/41.4; 179/100.2 A; 340/174.1 R

[56] References Cited

UNITED STATES PATENTS

| | | | |
|---|---|---|---|
| 2,857,476 | 10/1958 | Kleiber | 274/41.4 X |
| 3,149,996 | 9/1964 | Wagner et al. | 117/239 |
| 3,310,421 | 3/1967 | Flowers | 117/239 |
| 3,627,330 | 12/1971 | Dimitracopoulos | 274/41.4 |
| 2,844,665 | 7/1958 | Mann et al. | 274/41.4 |
| 3,566,356 | 2/1971 | Holm et al. | 179/100.2 X |
| 3,502,761 | 3/1970 | Dimitracopoulos | 274/41.4 X |
| 3,159,078 | 12/1964 | Schwartz et al. | 274/41.4 X |
| 2,501,126 | 3/1950 | Howell | 117/239 X |
| 2,819,186 | 1/1958 | Franck | 117/239 |

OTHER PUBLICATIONS

Vogel, IBM Tech. Dis. Bull., Vol. 13, No. 12, May 1971, 117–237, page 3863.

*Primary Examiner*—William D. Martin
*Assistant Examiner*—Bernard D. Pianalto
*Attorney*—Alexander, Sell, Steldt & Delahunt

[57] ABSTRACT

A composite film having a flexible heat-resistant base layer, a heat softenable pressure formable adherent intermediate layer, and a conformable upper layer of a magnetic powder oxide dispersed in a non-magnetic binder. The film can be permanently embossed in its upper surface upon pressure contact with a suitable heated die to provide thereon a guide pattern such as a spiral groove, and is thereafter useful as a sound disc.

4 Claims, 2 Drawing Figures

Figure 1:
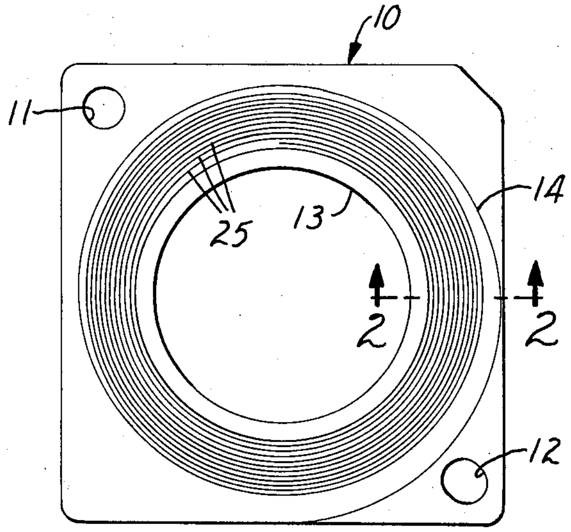

INVENTOR.
VICTOR R. FRANER
BY Kinney, Alexander, Sell, Steldt & DeLa Hunt
ATTORNEYS

EMBOSSABLE MAGNETIC COMPOSITE FILM

This invention relates to magnetic recording discs of the type having an electromagnetic transducer (recording head) guide pattern such as a spiral embossed in one surface. More particularly, the invention relates to a composite film capable of being formed into such magnetic recording discs.

The magnetic recording discs formed of the composite film of the invention are primarily intended for use in association with a photographic transparency or slide to provide an accompanying comment upon the subject matter of the transparency. Other uses, however, such as to provide a message source for phonographs, dictating machines, and the like, are contemplated for such a disc.

Devices which simultaneously project the image contained upon transparencies and also transcribe into an audible message the magnetic recording carried on the sound disc are known; for an example see U.S. Pat. No. 3,159,078. The disc usually has a window for mounting the transparency therein so that light rays may be projected therethrough, and is also usually shaped to fit within a carrier or holding means which can be positioned within such a device. An electromagnetic transducer, sometimes commonly referred to as a recording head, secured in the device on an arm or by other means, is brought into contact with the disc. The recording head, guided by the spiral pattern, follows the spiral to scan a predetermined surface of the disc. Thus messages which have been previously recorded on such a surface can be detected and by electronic means transcribed into sound.

Such recording discs are prepared by pressing a film blank against a die which has been engraved with a channel to produce the desired shape. Heretofore the film blank has consisted of a layer of magnetic oxide powder dispersed in a suitable binder which layer is disposed upon a layer of a thermoplastic material. The die is preheated to a temperature which will render the thermoplastic molten or sufficiently soft to permit it to flow under the pressure applied. With pressing, the binder layer is deformed by the thermoplastic layer to provide the desired guide pattern therein. The die must then be cooled, while maintaining the pressure, so as to solidify the disc. Premature removal will cause deformation of the pattern. Thereafter requisite guide holes and the transparency window are provided such as by punching out sections or cutting the disc.

As may be expected, pressuring, heating, and cooling must be accomplished with great care otherwise objectionable distortion or deformation of the disc will occur. Therefore, a considerable time has been required to produce each disc. Thus, the embossing technique utilizing currently known film blanks has proven slow and costly and does not lend itself to large scale production. Additionally, difficulty is encountered in cutting or punching out sections of prior art film blanks. For example, many prior art film blank materials will develop a ragged edge or be distorted by cutting or punching although they may otherwise have desirable properties. Several attempts have been made to speed up the production by using special dies, but these do little more than add to the cost of production; e.g., see U.S. Pat. No. 3,502,761.

There is provided by the present invention a composite film which can be rapidly formed with heat and pressure into sound discs without requiring subsequent cooling of the die or formed disc. The discs are formed without objectionable heat or pressure induced distortion. as s well as having the aforementioned desirable forming qualities, the composite film is easily perforated to provide openings in the disc without producing ragged edges and without distortion of the disc.

Figure 2:
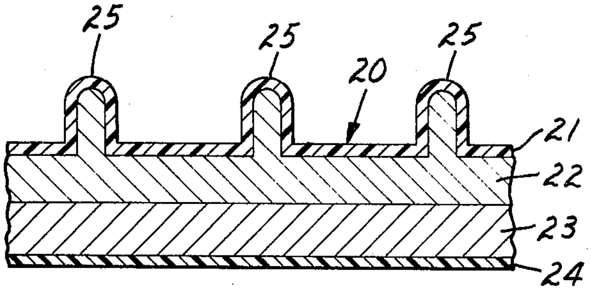

The present invention can best be understood and appreciated by reference to the accompanying drawing and wherein:

FIG. 1 is a plan view of a sound disc formed and cut from the composite film of the invention; and FIG. 2 is an enlarged fragmentary detail view in section taken along line 2—2 of FIG. 1 showing the layered structure of an embossed composite film.

FIG. 1 shows a typical disc 10 formed of the composite film of the invention with an embossed spiral guide pattern 14. Alignment holes 11 and 12 are provided for receiving corresponding bosses on a suitable mounting frame. The disc is usually held in such a mounting frame to be inserted in the aforementioned projection device so that a window 13 provided in the disc is disposed in the projected light path of the device. The frame is shaped to receive and hold a transparency in the window to permit the image contained thereon to be projected upon a viewing surface by the passage of light rays. Such frames are known; for an example see the aforementioned U.S. Pat. No. 3,179,078. Instead of being shaped as is shown in FIG. 1, it may be desired for some applications for the disc to have the shape of a flattened annulus.

FIG. 2 shows schematically in section a portion of the composite film 20 having ridges 25. Basically, the composite film 20 has three layers or lamina, namely, magnetic layer 21, intermediate layer 22, and base layer 23. Other layers, e.g., a low adhesion backsize layer 24 may optionally be provided for specific purposes, as will hereafter be described.

Base layer 23 is flexible, tough (i.e. substantially tear-resistant), moisture resistant, and has a high degree of dimensional stability. Additionally, layer 23 contains no substance such as iron oxide which may have an appreciable magnetic susceptibility. Layer 23, therefore, may be a sheet of non-magnetic metal such as aluminum or stainless steel, or a sheet of polymeric material, the preferred base layer 23 being a sheet of polymeric material. Intermediate layer 22 may be applied to layer 23 by coating a solvent solution of the material comprising layer 22, therefore, if this is the case, layer 23 should understandably be resistant to deformation and attack by such solvent. A preferred rigid polymeric material useful for the base or support layer 23 having the abovementioned properties is a film or sheet formed of a mixture of poly(ethylene terephthalate) and polysulfone such as disclosed in U.S. Pat. No. 3,640,944.

The intermediate layer 22 is adherent, heat softenable and pressure formable and contains no material having an appreciable magnetic susceptibility. The material comprising layer 22 is solid at room temperature; however, when heated, it will change its consistency to a putty-like or flowable state. Intermediate layer 22 forms an adherent bond with the other layers that resists separation even with flexing and temperature fluctuation. Materials which provide the desired heat softenable and pressure formable nature will be solid up to about 55° C. and will have a softening point within the temperature range 55° C. to 90° C., preferably within the range 60° C. to 80° C.

The softening point, determined according to a method similar to that disclosed in ASTM D1525–65T, is obtained by first placing a film of the material being tested approximately 5 mils in thickness on a flat quartz stage in a heating chamber. A 1 mm. diameter flat-faced quartz probe is then placed with its flat face against the top surface of the film. A loading of 10 grams is applied to the probe and the temperature in the chamber is raised at a constant rate of 5° C. per minute. Temperature is monitored by observing the response of a thermocouple located in the quartz stage closely adjacent to the film. The temperature at which the probe achieves a penetration of 0.5 mil into the film is taken as the softening point for purposes of evaluating materials for usefulness as an intermediate layer in the composite film of the invention.

Materials having a softening point below about 55° C. will form an intermediate layer that is too soft to properly support the magnetic oxide layer when a composite film containing such a layer is formed into a sound disc. As the transducer is lightly pressed against the surface of such a sound disc, it is likely to dig into such a soft surface and thereby reduce the quality of the sound reproduction. Exemplary resins which would not provide a suitable intermediate layer because they have a low softening point include an ethyl-vinyl acetate copolymer sold as "Elvax" which has softening point of about 53° C. according to the abovementioned test.

Materials having a softening point above about 90° C. are not desired because they will not provide an intermediate layer that will rapidly conform under application of moderate heat and pressure to the shape of a sound disc forming mold. Thus, although sound discs may be made of a composite film which includes an intermediate layer which softens above 90° C., the production of such a disc would probably not be economically feasible due to the prolonged pressing times required. Exemplary materials which are not desired for use in the intermediate layer because they have a high softening point, i.e., above 90° C., include resins such as polyvinyl chloride and polyvinyl butyral.

Materials having a softening point between 55° C. and 90° C. are found to have the proper balance of plasticity to permit them to be rapidly formed under heat and pressure into the desired shape and firmness to provide a useful sound disc. Exemplary materials having the desired softening point and adherent nature include polyester resins based upon poly(ethylene glycol-isophthalate/terephthalate) sold as "Dupont" adhesive No. 46950 and "Goodyear" polyester K–59–2, poly(ethylene glycol-terephthalate/sebacate) sold as "Dupont" adhesive 46960, poly(ethylene-terephthalate) sold as "Vitel" PE–207 and PE–209, poly(bisphenol A/ethylene glycol-terephthalate), poly(bisphenol A-isophthalate/terephthalate) sold as "American Cyanamid" TP–300, and butadiene-styrene copolymer mixtures, e.g., a mixture of 62.5 parts "Pliolite" S5 and 37.5 parts "Pliolite" S7.

Materials having a softening point above the desired softening range may be made to be useful by incorporating therein a sufficient quantity of a suitable compatible plasticizer. The choice of plasticizer and the amount used will of course depend upon the particular material selected. For example, the aforementioned polyvinyl butyral can be sufficiently plasticized with about 10 percent by weight dioctyl phthalate to provide a useful material which will soften within the desired temperature range.

The magnetic layer 21 indicated as the uppermost layer in FIG. 2 contains a magnetically suseptible material such as magnetic acicular gamma-iron oxide ($Fe_2O_3$) which may be prepared by grinding the oxide to a suitable degree of fineness in a ball mill or other grinding device in a manner well known in the art, e.g., see U.S. Pat. No. 3,566,356. The iron oxide particles are then distributed in a non-magnetic binder such as poly(vinyl chloride-acetate). Generally, the binder should not soften upon the application of heat at a temperature lower than the softening temperature of the polymeric resin comprising intermediate layer 22 although it may soften at about the same temperature. Layer 21 remains substantially unchanged in thickness when subjected to the hereinbelow described embossing conditions.

The composite film of the present invention can be prepared by first applying a coating of the material comprising the intermediate layer 22 to a film or sheet of the base or supporting material. Such coating may be accomplished by solvent casting, extrusion coating, or by laminating a film of the material comprising the intermediate layer to the base layer. After the intermediate layer is applied to the base, the magnetic layer is applied to the intermediate layer.

The preferred method of applying the intermediate coating involves solvent casting. The solvent solution or mixture of the material comprising the intermediate layer can be knife or reverse roll coated onto one surface of the support or base layer 23. Such coating solution can be dried by solvent evaporation in air.

Handling problems may be encountered because the dried intermediate layer is generally tacky in nature. However, lengths of the coated base layer may be coiled in the same manner as is a roll of pressure sensitive tape if the uncoated surface of the base layer 23 has been previously coated with a layer 24 of low adhesion backsize composition. Any one of a number of known backsize materials may function for this purpose. One example of a useful backsize composition is described in U.S. Pat. No. 2,532,011. If intermediate layer 22 and magnetic layer 21 are applied in tandem, i.e., one coating following another (with sufficient time allowed for the first coating to dry), the low adhesion backsize layer may be eliminated because the magnetic layer will serve such a function due to its non-tacky nature.

The magnetic layer is prepared by first dispersing a suitable magnetically susceptible material such as magnetic iron oxide ground to a suitable degree of fineness, in a non-magnetic coating medium such as a solution of poly(vinyl chloride-acetate) in methyl isobutyl ketone. The dispersion is applied to the surface of the aforementioned coated base layer by knife, reverse roll, or rotogravure coating techniques, and dried in air, e.g., in a forced air oven.

The composite film may have any desired or convenient width and a thickness between about 3 and 20 mils. Films greater than 20 mils may be useful in some applications, however, they may be too thick for use in conventional sound disc playing devices which are generally designed to receive sound discs less than 20 mils in thickness. The magnetic layer will account for about 0.7 to 0.9 mils of the thickness of the composite film with the remainder of the thickness divided between the other layers. Magnetic layers of greater than about 0.9 mils in thickness may be useful in some situations but such layers are not easily erased of previously recorded messages by conventional equipment. The intermediate layer will be at least thick enough to permit filling of an embossing channel during the forming operation as herein below described. The thickness of the intermediate layer therefore may vary depending upon the height and width of the spiral guide pattern of the sound disc. If the ridge comprising the guide pattern is relatively high or wide, the intermediate layer should be correspondingly thick. Generally, for the purpose of making an adequate guide pattern, the intermediate layer should be at least 1 mil in thickness, preferably at least 2 mils.

The composite films of the invention are normally prepared without the use of adhesion promoters to enhance adhesion between layers. Certain substances, however, may have difficulty in maintaining adhesion between layers and, therefore, the use of adhesion promoters to prepare such surfaces for coating may be desired.

A magnetic recording disc is prepared by pressing in a suitable die a film blank of the composite film of the invention. The pressing die has a spiral channel in an otherwise flat metallic plate having a very smooth surface. A sheet of the composite film of the invention is placed under the die. The die is preheated to a temperature sufficient to cause the polymeric resin of the intermediate layer 22 to achieve a putty-like or flowable consistency, but not to melt the binder of the magnetic layer. The film is pressed in a hydraulic press between the die and a flat surface for a time sufficient to cause the material of the intermediate layer to flow and exert a pressure on the magnetic layer against the channeled die, thereby forming a spiral ridge in the magnetic layer. While maintaining the heat, the pressure is removed, the die separated, and the disc is removed. Pressure of from about 1,000 to about 10,000 psi is adequate to produce the disc with pressing times required to obtain a suitable disc being surprisingly short, e.g., between 2 and 10 seconds, or less.

Guide holes and a window are provided by punching out area sections of the embossed disc with a suitable punch die.

The invention and varous modifications thereof will be more fully understood by reference to the following illustrative detailed description.

A 5 inch wide, 3 mil thick, continuous polyester/polysulfone base film having an acrylic acid octadecyl acrylate low adhesive backsize on one surface was knife coated over the opposite surface with a 40 percent solids solution of 50/50 poly/(ethylene glycol-isophthalate/terephthalate) resin (the resin being sold as "Dupont" No. 46950)/poly(ethylene glycol/polytetramethylene oxide-isophthalate/terephthalate/sebacate) sold as "Dupont" No. 49000 in 50/50 dioxnae/-toluene to provide a lightly tacky 3 mil thick coating of the resin in the base film after air drying. The resin coating was air dried by passing it through an oven having zones of increasing temperature between 50°–80° C. until the coating was substantially free of solvent.

The coated base film was knife coated over its lightly tacky surface with a dispersion of the following ingredients wherein the parts are by weight:

| | Parts |
|---|---|
| Acicular gamma-$Fe_2O_3$ having an average particle length of about one micron, a ratio of length to width of about 5:1 and a coercivity of approximately 300 oersteds | 70 |
| Lecithin | 2.45 |
| Lead carbonate | 1.01 |
| Lithium stearate | 1.04 |
| Carbon black | 4.20 |
| Poly(vinyl chloride/vinyl acetate) 90/10 | 14.70 |
| Non-acylated resinous polyester (Paraplex G-25) | 5.61 |
| Silicone oil | 0.74 |
| Methyl ethyl ketone | 28.0 |
| Toluene | 28.0 |
| Total | 156.0 |

The magnetic oxide coating was dried in an air oven that was heated in a temperature range of from about 60° to 90° C. to provide a composite filme having a magnetic oxide/binder layer about 0.75 mils in thickness.

The composite film was embossed with a spiral pattern by pressing it between a polished platen of a platen press and a polished die having a 3 mil wide, 3 mil deep spiral channel in its surface with the spiralling portions of the channel being separated by a distance of about 12 mils. The platen was heated at 65° C. and the die at 82° C. Pressure of about 4,800 psi was applied. The pressing time was that sufficient to achieve the 4,800 psi pressure, i.e., less than about 2 seconds. The embossed composite film was immediately removed from the die when the pressing was terminated and trimmed using a suitable punch to provide a sound disc such as that shown in FIG. 1.

The sound disc was placed in a suitable holder and inserted into a "3M" model No. 125 sound projector. A message was recorded on the sound disc which was thereafter played back. The recording was of high fidelity, free of objectionable noise and distortion.

What is claimed is:

1. An integral composite film capable of being rapidly embossed on application of heat and pressure in a suitable die to form a sound disc, said composite film comprising a flat flexible heat-resistant dimensionally stable film layer, an adherent heat softenable pressure formable intermediate layer, said intermediate layer having a thickness of at least 1 mil, being free of magnetically susceptible material and being comprised of a material having a softening point within a temperature range of 55°C. to 90°C., and a thin conformable upper layer of a magnetically susceptible material dispersed in a non-magnetic binder.

2. The film of claim 1 wherein said support layer comprises a mixture of a major portion of polyester resin and a minor portion of polysulfone resin.

3. The film of claim 1 wherein said intermediate layer is comprised of polyester resin.

4. The film of claim 3 wherein said polyester resin is poly(ethylene glycol-isophthalate/terephthalate) resin.

* * * * *

UNITED STATES PATENT OFFICE
CERTIFICATE OF CORRECTION

Patent No. 3,772,081 Dated November 13, 1973

Inventor(s) Victor R. Franer

It is certified that error appears in the above-identified patent and that said Letters Patent are hereby corrected as shown below:

Col. 2, line 3 "as s well" should be "Additionally, as well as"

Col. 5, line 46 "varous" should be "various"

Col. 5, line 53 "poly/(ethylene" should be "poly(ethylene"

Col. 6, line 20 "filme" should be "film"

Claim 1, line 5 "stable film layer" should be "stable support layer"

Signed and sealed this 9th day of April 1974.

(SEAL)
Attest:

EDWARD M.FLETCHER,JR.
Attesting Officer

C. MARSHALL DANN
Commissioner of Patents

FORM PO-1050 (10-69)

USCOMM-DC 60376-P69
U.S. GOVERNMENT PRINTING OFFICE : 1969 O - 366-334